(12) United States Patent
Higashionji et al.

(10) Patent No.: US 7,381,490 B2
(45) Date of Patent: Jun. 3, 2008

(54) POWER SYSTEM FOR FUEL CELL, ELECTRONIC EQUIPMENT AND ELECTRIC POWER FEEDING METHOD

(75) Inventors: Masaru Higashionji, Katano (JP);
Kenji Hasegawa, Hirakata (JP);
Masafumi Shimotashiro, Katano (JP);
Masaru Odagiri, Kawanishi (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 499 days.

(21) Appl. No.: 11/014,894

(22) Filed: Dec. 20, 2004

(65) Prior Publication Data

US 2005/0214606 A1 Sep. 29, 2005

(30) Foreign Application Priority Data

Mar. 25, 2004 (JP) ............................. 2004-088844

(51) Int. Cl.
*H01M 8/04* (2006.01)
*H02J 7/00* (2006.01)

(52) U.S. Cl. ........................................ 429/23; 320/128
(58) Field of Classification Search .................... 429/9, 429/23; 320/101, 128
See application file for complete search history.

(56) References Cited

U.S. PATENT DOCUMENTS

| | | | |
|---|---|---|---|
| 5,334,463 A | 8/1994 | Tajima et al. | |
| 5,916,699 A | 6/1999 | Thomas et al. | |
| 5,969,435 A | 10/1999 | Wilhelm | |
| 6,555,989 B1 | 4/2003 | Pearson | |
| 2003/0194588 A1 | 10/2003 | Sugiura et al. | |
| 2003/0224224 A1 | 12/2003 | Okada et al. | |
| 2004/0061474 A1 | 4/2004 | Ozeki | |
| 2004/0076860 A1 | 4/2004 | Aso | |

FOREIGN PATENT DOCUMENTS

| | | | |
|---|---|---|---|
| JP | 59-230434 | | 12/1984 |
| JP | 03-040729 | | 2/1991 |
| JP | 2989353 | | 10/1999 |
| JP | 2003-229138 | * | 8/2003 |
| JP | 2003-303605 | | 10/2003 |
| JP | 2003-346823 | | 12/2003 |
| JP | 2004-127619 | | 4/2004 |
| JP | 2004-146114 | | 5/2004 |

* cited by examiner

*Primary Examiner*—Stephen Kalafut
*Assistant Examiner*—Thomas H. Parsons
(74) *Attorney, Agent, or Firm*—McDermott Will & Emery LLP (57) ABSTRACT

As disclosed, there is provided a small-size power system for fuel cell allowing efficient extraction of electric power-output from a fuel cell and a secondary cell, electronic equipment, and an electric power feeding method. The power system for fuel cell has a voltage conversion circuit and a rectification circuit, and is structured such that output voltage of the fuel cell is converted with a set voltage, which is an output voltage corresponding to a maximum electric power-output of the fuel cell, as a reference to produce a switch voltage, and at least either the switch voltage or an output voltage of the secondary cell is outputted through the rectification circuit. This allows parallel operation of the fuel cell and secondary cell in a state that the electric power of the fuel cell can be utilized to the full.

38 Claims, 4 Drawing Sheets

POWER SYSTEM FOR FUEL CELL, ELECTRONIC EQUIPMENT AND ELECTRIC POWER FEEDING METHOD

TECHNICAL FIELD

The present invention relates to a power system for fuel cell, the power system having the fuel cell and a secondary cell for complementing electric power-output from the fuel cell by the secondary cell and for feeding the electric power to a load section, an electronic equipment incorporating the power system for fuel cell, and an electric power feeding method in the power system for fuel cell.

BACKGROUND OF THE INVENTION

Portable electronic equipment such as cellular phones, personal digital assistances, notebook-sized personal computers, portable audios and portable visuals has been becoming popular. Such portable electronic equipment is conventionally driven by primary cells or secondary cells. While the primary cells are single-use cells, the secondary cells are reusable and require chargers and charging time since they need to be charged after consumption of a specific amount of electric power. As the secondary cells, NiCd batteries or lithium-ion batteries are used, and although small-size batteries with high-energy density have been developed, batteries supporting continuous driving for a longer period of time are being demanded.

In order to meet the demand, fuel cells operated without charging have been proposed. The fuel cells are generators for electrochemically converting chemical energy of fuel to electric energy. Among the fuel cells, a Polymer Electrolyte Fuel Cell (PEFC) for generating electric power with use of a perfluorocarbon sulfonic acid-based electrolyte to reduce hydrogen gas in an anode and to reduce oxygen in a cathode is known as a cell with high output density, and its development is being pursued for application to automobiles and the like.

However, in the PEFC, hydrogen gas, is low in volumetric energy density, which necessitates the volume of a fuel tank to be enlarged. Further, auxiliary equipment such as devices to feed fuel gas and oxide gas to a power generator in the PEFC as well as humidifiers for stabilizing battery performance are required, which increases the size of the PEFC, making the PEFC unsuitable as a power source for portable electronic equipment. Accordingly, a Direct Methanol Fuel Cell (DMFC) for generating electric power by directly extracting protons from methanol is now under development.

The DMFC, although having a disadvantage that its output is smaller than that of the PEFC, has advantages that the volumetric energy density of fuel can be increased and auxiliary equipment for the power generator can be reduced, which allows downsizing. Because of this reason, the DMFC is drawing attention as a power source for portable electronic equipment and several proposals have been made.

The DMFC performs power generation by the reaction as defined in the following equation:

Anode side:

Cathode side:

More specifically, in the anode, methanol and water react by catalysis of a catalyst including ruthenium and platinum to produce hydrogen ions, electrons and carbon dioxide, where the electrons are outputted outside as electric power from the anode and the hydrogen ions are transmitted to the cathode side through an ion-permeable membrane. In the cathode, hydrogen ions receive electrons from the cathode and react with oxygen in the air to produce water. In this case, the efficiency of the DMFC is high when a power generation section is at a high temperature as high as the characteristics of the ion-exchange membrane permit, i.e., in the range of 60° C. to 80° C., and in high humidity.

In the present DMFC, however, resistances due to various losses (polarization) generated inside the fuel cell hinder obtainment of a theoretical electromotive force that is an ideal output, resulting in an output lower than the theoretical electromotive force. The losses due to the polarization include a loss caused by resistances called resistance polarization which hinders the flow of ions and electrons in the electrolyte, a loss caused by activation polarization due to consumption of activation energy in an electrochemical reaction, and a loss caused by so-called diffusion polarization due to consumption which occurs when reactants and reaction products spontaneously diffuse and migrate due to a continuous chemical reaction.

These polarizations occur in the anode and the cathode, and material development for solving these problems are under way. Though some improvement is seen, the present state is that if, for example, an ideal electromotive force of the DMFC is 1.2V and a theoretical efficiency is 97%, an electromotive force obtained in a practical level is at most around 0.3V due to internal voltage drop.

Consequently, the V-I characteristic of an output voltage of the fuel cell itself against a load current has a drooping characteristic with depending largely on load current, whereas output voltages of other secondary cell and primary cell are almost constant and stabilized with respect to the load current. More specifically, the fuel cell has a characteristic that extraction of a large amount of load current lowers the output voltage because of resistance inside the fuel cell. Therefore, the fuel cell generally has an optimum current which allows extraction of a maximum amount of electric power.

Moreover, the characteristic of the fuel cell implies that a method with use of auxiliary equipment such as pumps for feeding fuel and circulating air is practical and allows a stable operation and an end operation. However, this method entails a drawback that power generation is not started unless air and fuel are supplied to a battery cell of the fuel cell during start-up operation. Once the power generation is started, feeding of electric power to the auxiliary equipment such as pumps becomes possible with self generated electric power, though other auxiliary power sources, typically chargeable secondary cells, are necessary during the start-up operation or the end operation.

Examples of parallel operation of a secondary power source and a fuel cell have been disclosed in Patent Documents 1 and 2 shown below, both of which aim at stable feeding of electric power and therefore do not focus on the constitution for maximizing the power generation capacity of the fuel cell.

Patent Document 1: Japanese unexamined patent application No. 59-230434, and

Patent Document 2: Japanese unexamined patent application No. 3-40729

SUMMARY OF THE INVENTION

An effective system for the parallel operation of a fuel cell and a secondary cell against a load is such that a maximum output which allows continuous operation can be extracted from the fuel cell and a shortfall can be outputted from the secondary cell, and if there is still a surplus output of the fuel cell left after being fed to the load, then the surplus output can be used for charging the secondary cell. For example, in mobile notebook-sized personal computers and the like, such constitution can be considered that electric power necessary for general CPU operation, hard disk driving and screen display, which is equivalence to continuous power, is fed from the fuel cell, and if electric power, other than the continuous power, which is fed to external equipment such as external memories and external disks that are connected and operated via ports of the personal computers, is necessary, then a shortfall is outputted from the secondary cell.

However, in a case of excessive output from the fuel cell during operation even if the output is instantaneous, an electrolyte Membrane Electrode Assembly (MEA) is damaged, and rapid voltage drop occurs at a given load current or more. At this point, even if the load is decreased, the fuel cell has a characteristic that an initial output is not recovered and the fuel cell is broken down. Therefore in the fuel cell, if it is attempted to extract more output current than its optimum load current, the output voltage is dropped and therefore it is impossible to extract more than the maximum electric power. The fuel cell, if designed with an allowance regarding the output characteristics in consideration of this point, becomes too large in shape, which hinders reduction in size and weight of the fuel cell.

Moreover, in a case of the lithium secondary cell, the output capacity of the cell is unchanged even if a large amount of electric power is extracted. However, a cell life is shortened. Further, in the lithium cell, if full discharge capacity is depleted, the output voltage drops to a voltage called a final discharge voltage. For example, in the case of a maximum charge voltage of 4.3V per cell, over discharge of a voltage of 2.3V or lower is prohibited in terms of material characteristics, and a working voltage in the equipment side is in the range of 4.2 to 3.0V.

Therefore, according to the method in which outputs of the fuel cell and the lithium secondary cell are summed up via a diode, which is disclosed in the Japanese unexamined patent application No. 59-230434, a reference voltage for switching the fuel cell and the lithium cell varies unfavorably due to the voltage drop caused by discharge of the lithium cell. This results in an unexpected low-voltage output of the fuel cell, which may causes breakdown of the fuel cell as described above.

Accordingly, for solving the aforementioned various problems, novel concepts include a small-size power system for fuel cell allowing efficient extraction of electric power-output from the fuel cell and the secondary cell, electronic equipment incorporating the power system for fuel cell, and an electric power feeding method in the power system for fuel cell.

According to a first aspect, there is provided a power system for fuel cell comprising: a fuel cell configured to generate a first electric power; a secondary cell configured to output a secondary electric power; and a fuel cell controller connected to an output of the fuel cell for comparing a level of a fuel cell output voltage with a first predetermined value and with a second predetermined value for preventing the fuel cell from generating power when the level of the fuel cell output voltage is not more than the first predetermined value and for determining an output of the fuel cell and of the secondary cell based on the comparison of the level of the fuel cell output voltage with the second predetermined value.

The power system for fuel cell, which is composed of the fuel cell and the secondary cell for feeding electric power to the load section from at least either of them, utilizes V-I characteristic peculiar to the fuel cell so as to extract electric power of the fuel cell to a maximum extent. More specifically, the fuel cell has an internal resistance larger than that of other kinds of cells, and the V-I characteristic of the fuel cell is a drooping characteristic in which an output voltage of the fuel cell drops as a load of the load section increases. In order to operate the fuel cell having such characteristic in parallel with the secondary cell which outputs a relatively constant voltage with respect to fluctuation of the load, an output voltage of the secondary cell is set at a voltage (drooping voltage) in a change portion of the output voltage corresponding to the drooping characteristic of the fuel cell, so that the fuel cell and the secondary cell are connected in parallel by means of a rectification circuit, and feed electric power to the load section. Moreover, in order to independently extract the output of the fuel cell, the second predetermined value (hereinafter referred to as a "switch voltage") used for determining whether or not electric power is fed from at least either the fuel cell or the secondary cell to the load section is set by converting the output voltage of the fuel cell with use of an output voltage of the fuel cell corresponding to a maximum electric power-output of the fuel cell as a reference.

It is to be noted that the secondary cell may be embodied by, for example, a lithium-ion cell, a nickel-cadmium cell, a lead cell or the like.

Further, the power system for fuel cell particularly has the fuel cell controller (hereinafter referred to as a "voltage conversion circuit") and the rectification circuit. In the voltage conversion circuit, there is set the switch voltage for determining feeding of electric power from at least either the fuel cell or the secondary cell to the load section. The switch voltage, which is set by converting the output voltage of the fuel cell, takes an almost constant value. The rectification circuit compares the switch voltage with the output voltage of the secondary cell, and operates such that electric power is fed from the one that outputs a higher voltage to the load section. Therefore, the reference voltage, which is used for determining which the fuel cell or the secondary cell feeds electric power to the load section, can be prevented from suffering fluctuation caused by the voltage drop of the output voltage of the secondary cell as seen in the conventional example.

Further, the voltage conversion circuit is composed of a voltage detection section, a voltage setting section, and a feedback section. The voltage detection section detects the output voltage of the fuel cell, and when the output voltage of the fuel cell is beyond the first predetermined value (hereinafter referred to as a "set voltage"), the voltage setting section and the feedback section convert the output voltage of the fuel cell to a voltage over a maximum output voltage of the secondary cell to set the switch voltage. When the voltage detection section detects that the output voltage of the fuel cell reaches the set voltage or lower, the feedback section orders the voltage setting section to terminate output. During the period from the moment that the output voltage of fuel cell reaches the set voltage or lower to the moment that the output voltage of fuel cell reaches a breakdown voltage of the fuel cell, the output voltage of the voltage conversion circuit is dropped to a final discharge voltage of the secondary cell or lower by the termination of output. This is a voltage drooping characteristic that the voltage conversion circuit possesses.

Further, the power system for fuel cell may comprise a charge circuit for charging the secondary cell. The charge circuit is composed of an output voltage comparator circuit and a charge switch circuit. The output voltage comparator circuit compares the output voltage of the fuel cell and the set voltage, and also compares the output voltage of the secondary cell and a chargeable voltage of the secondary cell. The charge switch circuit applies the output voltage of the fuel cell to the secondary cell to charge the secondary cell only when the output voltage comparator circuit detects that the output voltage of the fuel cell is beyond the set voltage and the output voltage of the secondary cell is the chargeable voltage or lower.

Further, after charging to the secondary cell is started by the charge switch circuit, the output voltage comparator circuit further detects a charge termination voltage that is an arbitrary voltage value lower than the set voltage. When the output voltage comparator circuit detects the charge termination voltage, the charge switch circuit terminates charging to the secondary cell.

Further, the power system for fuel cell may comprise an output termination circuit. The output termination circuit is connected between the output side of the secondary cell and the load section for detecting that the output voltage of the secondary cell is lowered to a load termination voltage which is slightly higher than the final discharge voltage of the secondary cell. Then, the output termination circuit terminates output from the secondary cell to the load section when the load termination voltage is detected.

Further, according to a second aspect, there is provided electronic equipment incorporating the power system for fuel cell in the first aspect and the load section for receiving electric power fed from the power system for fuel cell.

According to the power system for fuel cell in the above-described first aspect, the power system for fuel cell is composed of the voltage conversion circuit and the rectification circuit, so that with use of the set voltage that is the output voltage corresponding to the maximum electric power-output of the fuel cell as a reference, the output voltage of the fuel cell is converted to produce the switch voltage, and at least either the switch voltage or the output voltage of the secondary cell is outputted through the rectification circuit. This allows parallel operation of the fuel cell and secondary cell in the state that the electric power of the fuel cell is fully utilized, enabling electric power-output to be efficiently extracted from the fuel cell and the secondary cell.

Further, since the power system for fuel cell is provided with the voltage conversion circuit and the rectification circuit, a voltage, which is used for determining which cell feeds electric power to the load section, the fuel cell or the secondary cell, can be prevented from suffering fluctuation caused by the voltage drop of the output voltage of the secondary cell as seen in the conventional example. Further, this constitution can prevent an unexpected low-voltage output of the fuel cell or breakdown of the fuel cell. Further, the voltage conversion circuit has a drooping characteristic in which the output voltage of the voltage conversion circuit is forced to be dropped by the voltage detection section, the voltage setting section and the feedback section included in the voltage conversion circuit when the output voltage of the fuel cell reaches the set voltage or lower. Therefore, the fuel cell will not output electric power at a low voltage, making it possible to prevent breakdown of the fuel cell from occurring.

Further, since the power system for fuel cell is provided with the voltage conversion circuit and the rectification circuit, electric power-output can be efficiently extracted from the fuel cell and the secondary cell. Moreover, since the power system for fuel cell possesses the drooping characteristics, so that the fuel cell does not have to take a large allowance in design, making it possible to achieve downsizing.

Further, since the power system for fuel cell is provided with the charge circuit, the aforementioned effects may be achieved, and in addition, the secondary cell may be charged when the fuel cell has a surplus output. Further, since the charge circuit has the output voltage comparator circuit and the charge switch circuit, charging can be made only when there is a surplus in the electric power-output of the fuel cell and the secondary cell is at a voltage that accepts the charge. Therefore, the secondary cell can be charged without imposing a load on electric power feeding to the load section.

Further, since the output voltage comparator circuit detects the charge termination voltage, it becomes possible to prevent the secondary cell from instantly changing from a charge state to an output state, making it possible to reduce a load imposed on the secondary cell.

Furthermore, since the power system for fuel cell is provided with the output termination circuit, output from the secondary cell to the load section is terminated if the output voltage of the secondary cell would drop to the vicinity of the load termination voltage, thereby making it possible to prevent breakdown of the secondary cell.

According to the electronic equipment in the aforementioned second aspect, since the electronic equipment has the power system for fuel cell having the above effects, the electronic equipment allows stable feeding of electric power and makes it possible to downsize the entire equipment.

BRIEF DESCRIPTION OF THE DRAWINGS

These and other objects and features will become apparent from the following description taken in conjunction with preferred embodiments with reference to the accompanying drawings, in which.

DETAILED DESCRIPTION OF THE PREFERRED EMBODIMENTS

Description is now given of a power system for fuel cell, electronic equipment incorporating the power system for fuel cell, and an electric power feeding method in the power system for fuel cell in the embodiment with reference to the drawings. It is to be noted that like parts are designated by like reference numerals throughout the respective drawings.

First Embodiment

Figure 1:
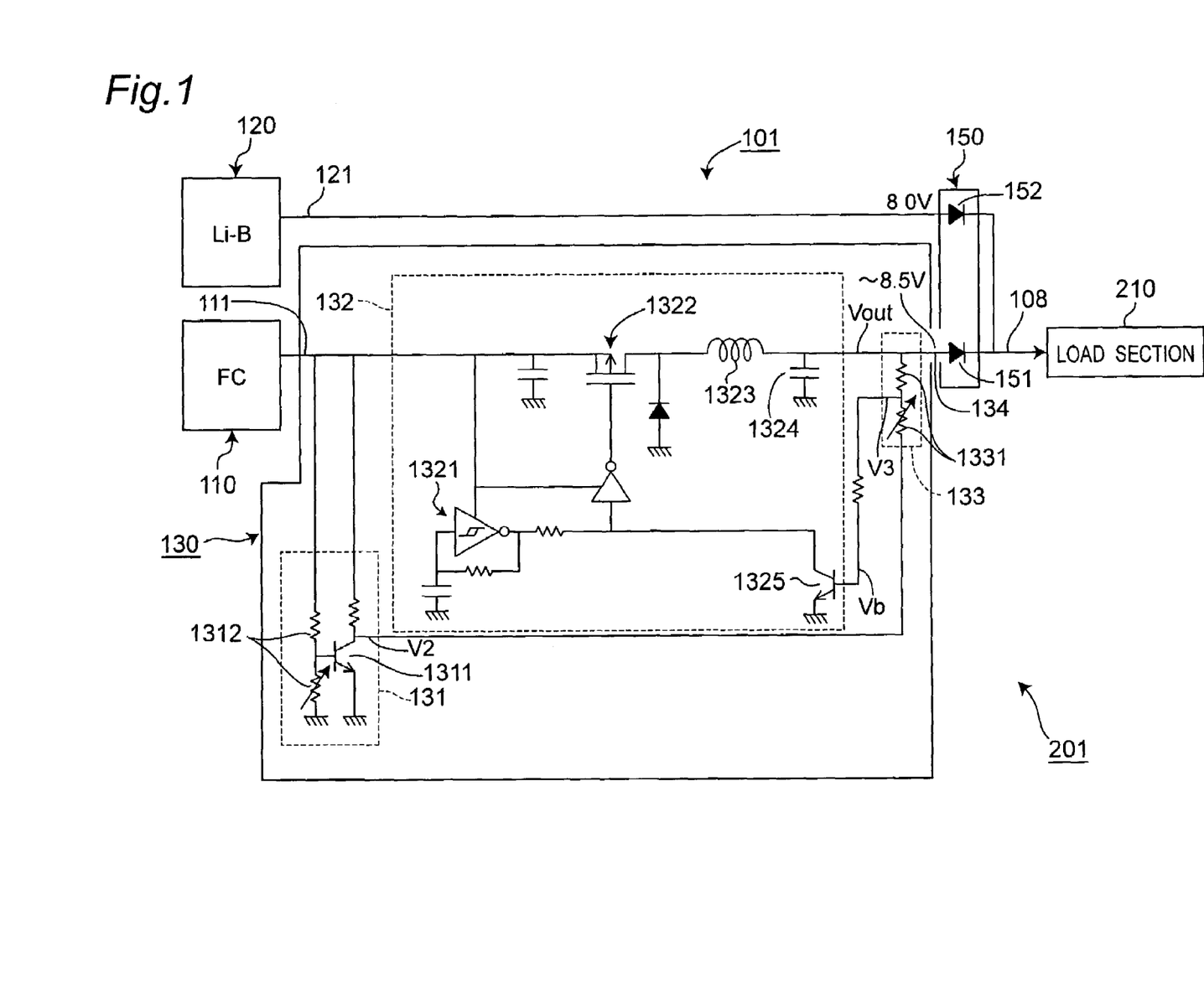
FIG. 1 is a view showing a configuration of a power system for fuel cell in a first embodiment.

A power system for fuel cell 101 shown in FIG. 1 exemplifying the power system for fuel cell comprises a fuel cell 110 for generating electric power with use of hydrogen and oxygen and feeding the electric power to a load section 210, a secondary cell 120 for complementing electric power-output of the fuel cell 110 and feeding electric power to the load section 210, a voltage conversion circuit 130 connected between an output side of the fuel cell 110 and the secondary cell 120, and a rectification circuit 150 connected between an output side of the voltage conversion circuit 130 and an output side of the secondary cell 120, and the load section 210.

Figure 8:
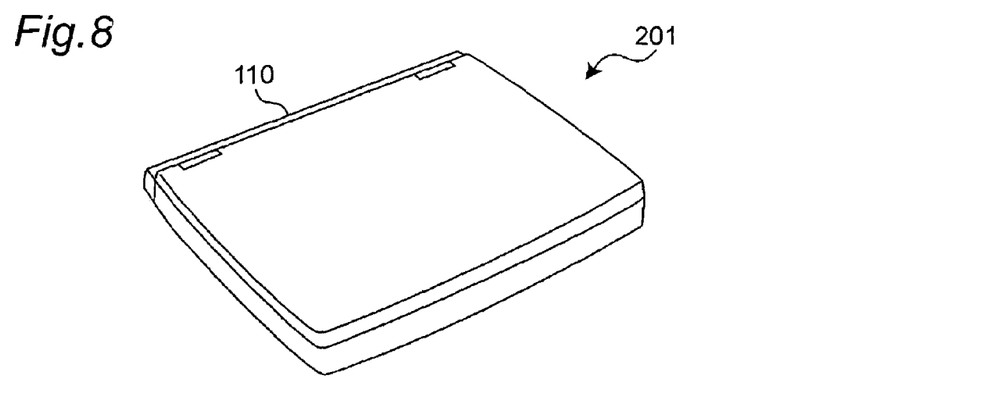
FIG. 8 is a perspective view showing electronic equipment incorporating the fuel cell system shown in FIG. 1 or FIG. 2.

Moreover, the power system for fuel cell 101 and the load section 210 may constitute electronic equipment 201 such as a notebook-sized personal computer as shown in FIG. 8. In this case, inside the personal computer, the secondary cell 120, the voltage conversion circuit 130, the rectification circuit 150 and the load section 210 are included, and the fuel cell 110 is structured so as to be mounted to and dismounted from the personal computer mainframe.

The fuel cell 110, which is of the aforementioned DMFC type, forms a Membrane Electrode Assembly (MEA) with an ion conductive film interposed in between a pair of an anode and a cathode. In the present embodiment, 30 power generating cells having the membrane electrode assembly are connected in series to constitute the fuel cell 110. A theoretical voltage of one power generating cell is 1.21V. However, in reality, voltage reduction occurs due to various losses and so an open-circuit voltage in no-loaded state is about 23V.

Figure 3:
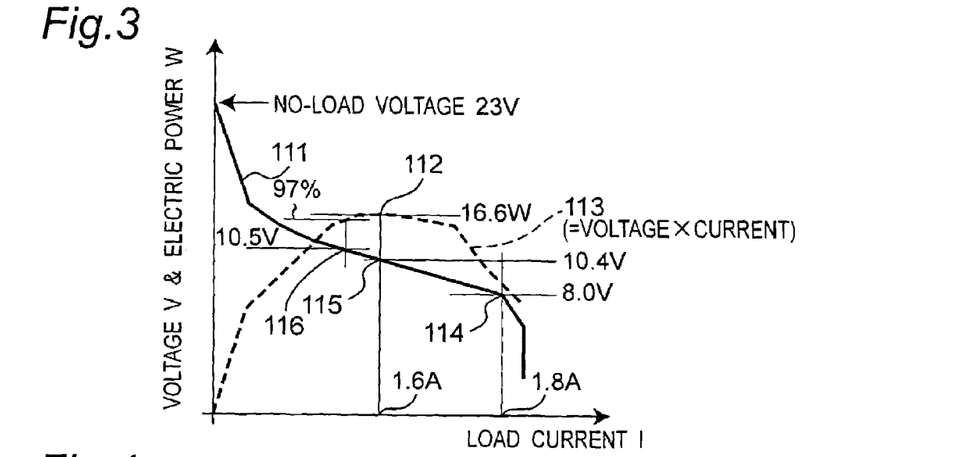
FIG. 3 is a graph view showing a voltage-current characteristic of a fuel cell included in the power systems for fuel cell shown in FIG. 1 and FIG. 2.

A fuel cell generally has a maximum electric power-output 112 extractable from the fuel cell 110 because increased current to be fed to the load section 210 reduces an output voltage 111 of the fuel cell 110 as shown in the case of a discrete fuel cell in FIG. 3. In the present embodiment, the maximum electric power-output 112 can be extracted when the output voltage 111 of 10.4V and 1.6 A is fed, and the maximum electric power-output 112 is 16.6W. Thus, the fuel cell 110 has voltage drop depending on an output (load) current, and therefore the fuel cell 110 has a specific output voltage corresponding to the maximum electric power-output 112. An electric power-output 113 of the fuel cell 110 which can be extracted from the fuel cell 110 is reduced when the output voltage of the fuel cell 110 is higher or lower than the specific output voltage. As described later, in the present embodiment, the specific output voltage corresponding to the maximum electric power-output 112 is referred to as a set voltage 115.

Further, as shown in FIG. 3, if 1.8 A or more load current is extracted, then the output voltage 111 of the fuel cell 110 is reduced sharply and the extractable electric power-output 113 is also reduced. This is a dangerous state for the fuel cell 110, where an irreversible reaction occurs, the fuel cell 110 itself is damaged, and even if the fuel cell 110 is restarted, it becomes impossible to generate sufficient electric power as before. Thus, the fuel cell 110 has a breakdown voltage 114 which makes the fuel cell 110 broken when the load current is extracted from the fuel cell 110 and then the output voltage 111 is reached at or lower than a specific voltage. Generally in the DMFC, a voltage around 0.26V per power generating cell is considered to be the breakdown voltage. In the present embodiment, 30 cells are connected in series as described above, so that approximately 7.8V, or almost 8V constitutes the breakdown voltage 114.

These characteristics are generally properties of the DMFC, and if the power generating cells composed of one MEA are connected in series, each voltage of connected cells is added up to be a breakdown voltage 114. Moreover, as an output management of the fuel cell 110, it is effective to manage the output voltage 111 because a voltage value is more sensitively reacted than an extracted current value.

Figure 4:
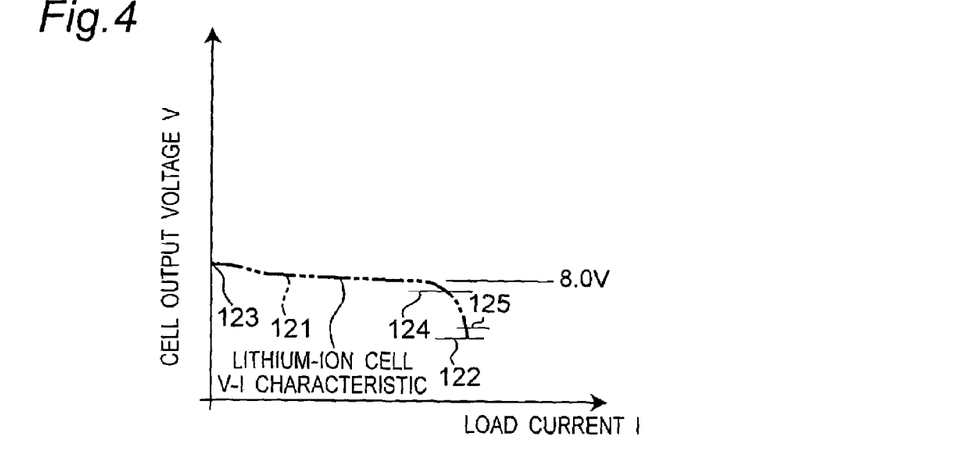
FIG. 4 is a graph view showing a voltage-current characteristic of a lithium-ion cell included in the power systems for fuel cell shown in FIG. 1 and FIG. 2.
Figure 5:
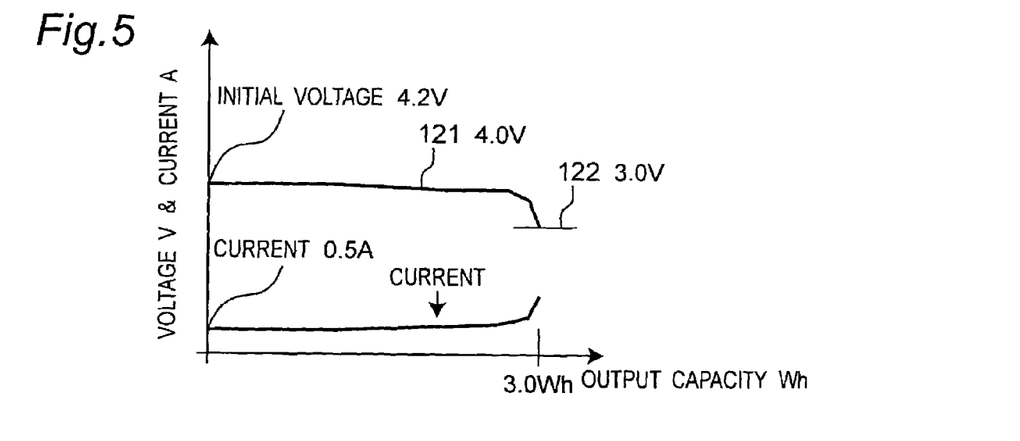
FIG. 5 is a graph view showing a discharge characteristic of a discrete lithium-ion cell.

In the present specification, the secondary cell 120 is a cell excluding the fuel cell 110, and as auxiliary secondary cells 120 in the present embodiment, two lithium-ion cells are used and connected in series. As shown in FIG. 5, a charge voltage of one lithium-ion cell is 4.2V, a final discharge voltage 122 is 3.0V, and its output capacity is 830 mAh. In practice, the life of the lithium-ion cell is 1.5 hours when a load current of 0.5A is fed at a constant output voltage of 4V. When two such lithium-ion cells are connected in series, an initial voltage, i.e., a maximum output voltage 123 of the lithium-ion cell 120 is 8.4V as shown in FIG. 4, and the final discharge voltage 122 is 6.0V. Two lithium-ion cells 120 connected in series can feed at a voltage twice as high, so that approximately 4W electric power can be fed for 1.5 hours.

Unlike the fuel cell 110, the lithium-ion cell 120 can feed at an almost constant output voltage 121 without depending on a load current in a normal use state as shown in FIG. 4. In the present embodiment, the output voltage 121 of the lithium-ion cell 120 is almost 8.0V.

As shown in FIG. 5 showing a discharging characteristic of a discrete lithium-ion cell with a constant load of 2W, if the lithium-ion cell is used to the extent of a maximum load capacity, the output voltage 121 declines and a limit voltage of the lithium-ion cell is a final discharge voltage 122 of 3.0V. If discharge is continued beyond the final discharge voltage 122, an irreversible reaction occurs even in the lithium-ion cell, which leads to breakdown of the cell.

In the case of the lithium-ion cell 120, management of a charge voltage and the final discharge voltage 122 are important. The secondary cell 120 is a power source essential for operation of auxiliary equipment that is necessary for activating the fuel cell 110, and in a case where electric power from the fuel cell 110 is not enough for the load, the secondary cell 120 outputs additional electric power as an auxiliary power source. Further, at a time of terminating the output from the fuel cell 110, the secondary cell 120 is necessary for securing post-processing electric power after completion of operation of the auxiliary equipment.

In the notebook-type personal computer as the electronic equipment 201, the aforementioned fuel cell 110 and the secondary cell 120 composed of the lithium-ion cell are operated in parallel, and a maximum load in the present embodiment is 20W. A general electric power of this personal computer 201 is 16W, which is sufficient enough for operation of internal CPU, HDD, liquid crystal display and the like. However, with external equipment such as FDDs and memory cards connected to external ports of the computer 201, a maximum power consumption is designed to be 20W.

If the entire electric power of 20W necessary for the personal computer 201 is fed from a fuel cell only, the fuel cell having an adequate capacity is required. Power generation capability of the fuel cell is proportional to an area of the MEA that contributes to an electrochemical reaction, so that volume of the fuel cell is increased in proportion to 1.5th power of the power generation capability. Therefore, if the fuel cell for 16W is designed for 20W, the volume becomes 1.4 times larger. As to the fuel cell for mobile application, it is important to downsize as much as possible in view of a commercial value. Moreover, since it is an advantage that the fuel cell allows replacement of fuel and continuous driving, electric power of the fuel cell is given preference in electric power feeding to the electronic equipment 201.

In the power system for fuel cell 101 in the present embodiment, the following electric power management is performed. That is, the lithium-ion cell 120 which requires charge operation is used when electric power feeding from the fuel cell 110 is not available, i.e., at the time of receiving excessive load, or for driving the auxiliary equipment during start-up of the fuel cell 110, and the like. Normally, the fuel cell 110 feed electric power to the load section 210. Further, for example at the time of light load when the personal computer 201 suspends data processing or the like, the electric power-output from the fuel cell 110 is used for charging the lithium-ion cell 120.

The voltage conversion circuit 130, which is connected between the output side of the fuel cell 110 and the load section 210 as described above, is a circuit for setting a switch voltage 134 by converting the output voltage 111 of the fuel cell 110 with the set voltage 115 as a reference. The switch voltage is used for determining that electric power is fed from at least either the fuel cell 110 or the secondary cell 120 to the load section 210.

As described above, the output voltage 111 of the fuel cell 110 has a specified output voltage corresponding to the maximum electric power 112 of the fuel cell 110. Therefore, in the present embodiment, as described FIG. 3, the specified output voltage of the fuel cell 110 corresponding to the maximum electric power-output 112 is set to be the set voltage 115. In the case of the present embodiment, the set voltage 115 is 10.4V to be precise.

The voltage conversion circuit 130 having such functions particularly has, as shown in FIG. 1, a voltage detection section 131 for detecting the output voltage 111 of the fuel cell 110, a voltage setting section 132 for setting the switch voltage 134, and a feedback section 133 for applying feedback to the voltage outputted from the voltage setting section 132. The switch voltage 134 corresponding to the output voltage of the voltage conversion circuit 130 is set at 8.5V that is slightly higher than 8.0V corresponding to the output voltage 121 of the lithium-ion cell 120 serving as the secondary cell in the present embodiment. The output voltage of the voltage conversion circuit 130 is set at a voltage higher than the output voltage 121 of the lithium-ion cell 120 because the output voltage 121 of the lithium-ion cell 120 is almost constant regardless of fluctuation of the load as described above, whereas the output voltage 111 of the fuel cell 110 is variable and can generate a voltage higher than the output voltage 121 of the lithium-ion cell 120, and electric power is normally desired to be fed from the fuel cell 110 side to the load section 210. Further, a voltage difference of 0.5V is provided so that extreme voltage change would not occur when electric power feeding sources are switched between the lithium-ion cell 120 and the fuel cell 110. It should naturally be understood that the voltage difference and the switch voltage value are set in conformity to configuration examples of the power system for fuel cell, and therefore not limited to the aforementioned respective values.

The voltage setting section 132, which includes an oscillator 1321, a first transistor 1322, a coil 1323, a capacitor 1324 and a third transistor 1325, changes the output voltage 111 of the fuel cell 110 into a pulsed voltage by switching the output voltage 111 with the first transistor 1322, and smooth the output voltage 111 by passing through a low-frequency component of the pulsed voltage in the coil 1323 and the capacitor 1324. In the feedback section 133, feedback is applied to a voltage of the capacitor 1324, i.e., an output voltage Vout of the voltage setting section 132, and if the resultant voltage exceeds a later-described predetermined voltage, then the switching of the first transistor 1322 is stopped, while if the resultant voltage reaches the predetermined voltage or lower, the switching is executed and the smoothing is performed. It is to be noted that the third transistor 1325 controls ON/OFF switching of the first transistor 1322. The feedback section 133 has resistances 1331 for dividing the output voltage Vout of the voltage setting section 132, and divides the output voltage Vout to produce a base voltage Vb that is applied to a base of the third transistor 1325.

Thus, the voltage setting section 132 executes switching ON/OFF of the first transistor 1322 and then performs the smoothing. The smoothed voltage becomes an output voltage of the voltage conversion circuit 130, i.e., the switch voltage 134 shown in FIG. 6.

The voltage detection section 131 has a second transistor 1311 and resistances 1312 for setting a base voltage of the second transistor 1311 at around 0.6V.

Thus-configured voltage detection section 131, the voltage setting section 132 and the feedback section 133 function as follows. That is, when the load current is lower than the maximum electric power 112 of the fuel cell 110, i.e., the load current is in a relatively low state, the output voltage 111 of the fuel cell 110 is over the set voltage 115. In this case, the base voltage of the second transistor 1311 is beyond 0.6V, the second transistor 1311 is in ON state, and an output voltage V2 of the voltage detection section 131 is in GND level (ground level). Therefore, in the feedback section 133, the output voltage Vout is divided by the resistances 1331 to produce the base voltage Vb as a feedback voltage V3 independently of the output voltage V2. It is to be noted that in the present embodiment, a design value of the output voltage Vout is 8.5V while the feedback voltage V3 is 0.6V. Therefore, the third transistor 1325 in the voltage setting section 132 is put in ON state when the base voltage Vb is beyond 0.6V, i.e., the output voltage Vout is beyond 8.5V, and the switching in the first transistor 1322 in the voltage setting section 132 is stopped. When the base voltage Vb is 0.6V or lower, i.e., when the output voltage Vout is 8.5V or lower, the third transistor 1325 is put in OFF state, and the switching of the first transistor 1322 is performed. Thus, the output voltage Vout is fixed to almost 8.5V.

Figure 6:
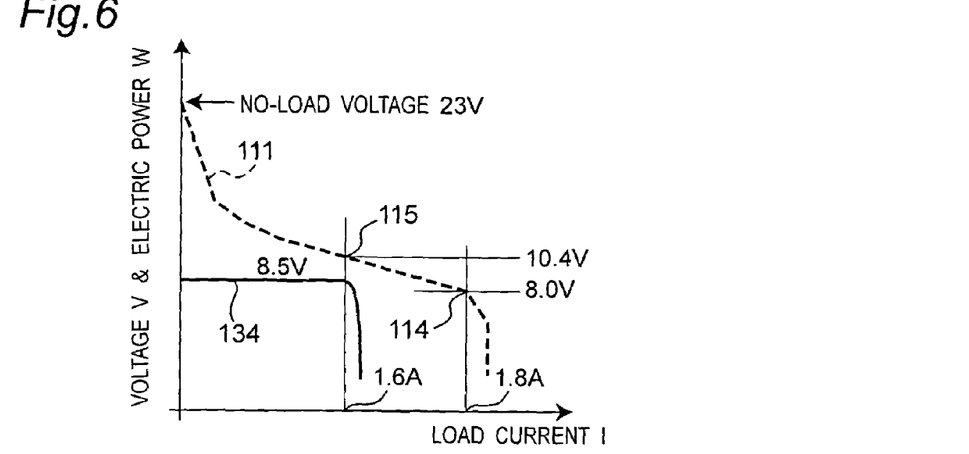
FIG. 6 is a graph view showing a voltage-current characteristic of a voltage conversion circuit included in the power systems for fuel cell shown in FIG. 1 and FIG. 2.

As the load current for the fuel cell 110 increase, the output voltage 111 of the fuel cell 110 gradually declines due to its characteristic. In a state that the load current exceeds 1.6A corresponding to a maximum output current of the fuel cell 110, the output voltage 111 of the fuel cell 110 reaches the set voltage 115 or lower. At the state, the base voltage of the second transistor 1311 is 0.6V or lower and the second transistor 1311 is put in OFF state. Therefore, the output voltage V2 of the voltage detection section 131 is equal to the output voltage 111 of the fuel cell 110. In the feedback section 133, the feedback voltage V3 is influenced by the output voltage V2, and if the output voltage V2 is sufficiently low, then the output voltage 111 is applied to the feedback section 133 as it is. Therefore, the base voltage Vb of the third transistor 1325 in the voltage setting section 132 exceeds 0.6V independently of the output voltage Vout, the third transistor 1325 is put in ON state, and the switching of the first transistor 1322 in the voltage setting section 132 is stopped. Therefore, the voltage detection section 131 does not output. In this manner, the voltage conversion circuit 130 has a drooping characteristic that the output voltage, i.e., the switch voltage 134 is forced to be dropped when the output voltage 111 of the fuel cell 110 reaches the set voltage 115 or lower as shown in FIG. 6. The drooping characteristic is characteristic in which during the period from the moment that the output voltage 111 of the fuel cell 110 reaches the set voltage 115 or lower to the moment that the output voltage 111 reaches the breakdown voltage 114 of the fuel cell 110, that is 8V in the present embodiment, the output voltage of the voltage conversion circuit 130 is dropped to the final discharge voltage 122 of the secondary cell 120, that is 6V or lower in the present embodiment.

The rectification circuit 150 is composed of a diode 151 which is connected to the output side of the voltage conversion circuit 130 and a diode 152 which is connected to an output side of the lithium-ion cell 120. The aforementioned output voltage of the voltage conversion circuit 130, that is the switch voltage 134 of approximately 8.5V, and the output voltage 121 of the lithium-ion cell 120 of approximately 8.0V are applied to the rectification circuit 150. The respective diodes 151, 152 are connected to the load section 210, and when a forward voltage is applied, the diodes 151, 152 are put in ON state and pass a current.

Therefore, in a state that the switch voltage 134 which is the output voltage of the voltage conversion circuit 130 exceeds the output voltage 121 of the lithium-ion cell 120 as in normal operation, a voltage acts in reverse direction on the diode 152 connected to the lithium-ion cell 120. Consequently, the diode 152 is put in OFF state, so that electric power is not outputted from the lithium-ion cell 120 to the load section 210 but is fed from the fuel cell 110 side, i.e., the voltage conversion circuit 130, to the load section 210. In a state that the output voltage 121 of the lithium-ion cell 120 exceeds the switch voltage 134 that is the output voltage of the voltage conversion circuit 130, the diode 151 is put in OFF state and the diode 152 is put in ON state, so that electric power is fed from the lithium-ion cell 120 to the load section 210.

Further, when the switch voltage 134 that is the output voltage of the voltage conversion circuit 130 is equal to the output voltage 121 of the lithium-ion cell 120, electric power is fed from both the voltage conversion circuit 130 and the lithium-ion cell 120.

As described above, in the normal operation, electric power is fed from the voltage conversion circuit 130 to the load section 210, and the output voltage of the fuel cell 110 is lowered when the load current is extracted as stated before. Therefore, if the load current is extracted from the fuel cell 110 till the output voltage of the fuel cell 110 is below the output voltage 121 of the lithium-ion cell 120, the diode 151 is automatically put in OFF state as stated above, stopping current flow from the fuel cell 110 side, i.e., the voltage conversion circuit 130, to the load section 210. Instead, the diode 152 on the lithium-ion cell 120 side is put in ON state, and electric power is fed from the lithium-ion cell 120.

However, since the stop of current flow from the fuel cell 110 side eliminate the load, the fuel cell 110 is revived and the output voltage 111 of the fuel cell 110 rises, resulting in the rise of the output voltage of the voltage conversion circuit 130. Consequently, the diode 151 is put in ON state again, and current flow from the voltage conversion circuit 130 to the load section 210 is restarted. Due to the current flow, the output voltage of the voltage conversion circuit 130 is dropped again and current flow from the voltage conversion circuit 130 to the load section 210 is stopped. Thus, by repeating such operation, the fuel cell 110 side feeds an output equivalent to the output voltage 121 of the lithium-ion cell 120 to the load section 210, and the rest of the electric power is fed from the lithium-ion cell 120.

Description is now given of the operation of the above-configured power system for fuel cell 101 in the present embodiment.

Figure 7:
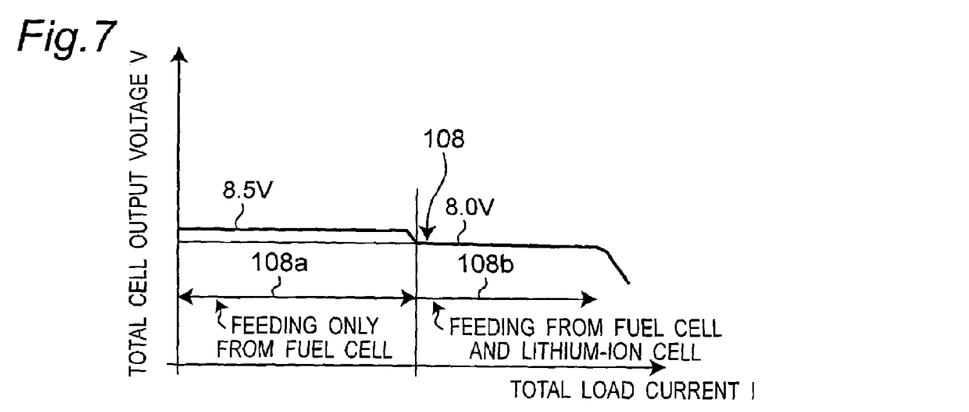
FIG. 7 is a graph view showing a voltage-current characteristic in the power systems for fuel cell shown in FIG. 1 and FIG. 2.

As repeatedly stated, when the load current is relatively low and the output voltage 111 of the fuel cell 110 exceeds the set voltage 115 of 10.4V, electric power is fed from the fuel cell 110 side to the load section 210 in the power system for fuel cell 101 as described above and as shown in a first portion 108a in an output voltage 108 of the power system for fuel cell 101 in FIG. 7.

If the load current increases and the output voltage 111 of the fuel cell 110 reaches the set voltage 115 that is 10.4V or lower, the output voltage of the voltage conversion circuit 130, i.e., the switch voltage 134, is forced to be rapidly dropped as described above, so that the output voltage of the voltage conversion circuit 130 becomes below the output voltage 121 of the lithium-ion cell 120. Therefore, as show in a second portion 108b of the output voltage 108 in FIG. 7, electric power is fed from the lithium-ion cell 120 to the load section 210. In this case, electric power may be fed alternatively from the fuel cell 110 side and the lithium-ion cell 120 side to the load section 210 as stated before.

Thus, the operation allowing the maximum use of the electric power-output of the fuel cell 110 and feeding of a shortfall from the lithium-ion cell 120 is implemented by utilizing the specific V-I characteristic of the fuel cell 110 that the output voltage varies according to the load current in the fuel cell 110, providing the drooping characteristic to the voltage conversion circuit 130 in consideration of the characteristic of the lithium-ion cell 120 that an almost constant voltage is outputted to the load current, and connecting the output side of the voltage conversion circuit 130 having the drooping characteristic and the output side of the lithium-ion cell 120 in parallel via the diodes.

More specifically, simply connecting the fuel cell and the lithium-ion cell in parallel cannot retain the state that allows maximum use of the electric power of the fuel cell. In the present embodiment, the voltage conversion circuit 130 is provided, the output voltage for the fuel cell 110 to feed maximum electric power is set to the set voltage 115, and the output voltage 111 of the fuel cell 110 is converted with the set voltage 115 as a reference to produce the switch voltage 134, which makes it possible to feed electric power with maximum use of the electric power-output of the fuel cell 110. Moreover, the drooping characteristic is a characteristic in which till the output voltage of the fuel cell 110 reaches the breakdown voltage 114, the output voltage of the voltage conversion circuit 130 is dropped to the final discharge voltage 122 of the lithium-ion cell 120 or lower. Therefore, the output voltage of the fuel cell 110 is prevented from reaching the breakdown voltage 114, thereby making it possible to prevent the fuel cell 110 from breaking down.

It is to be noted that connecting the fuel cell 110 side and the lithium-ion cell 120 side in parallel with the diodes 151, 152 generates a slight voltage drop in the diodes 151, 152. In order to minimize the voltage drop, the diodes 151, 152 should preferably be Schottky diodes.

Second Embodiment

Figure 2:
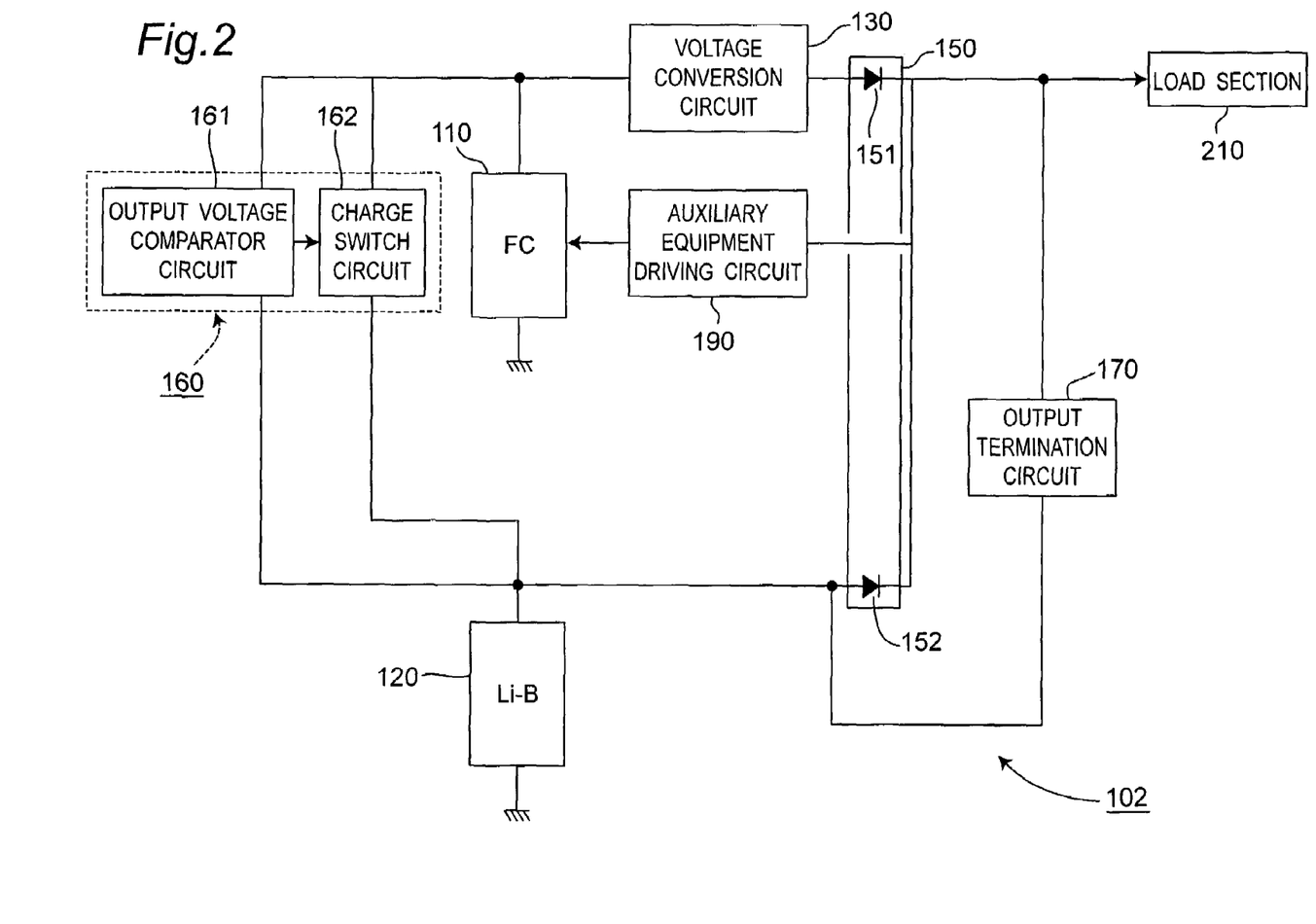
FIG. 2 is a view showing a configuration of a power system for fuel cell in a second embodiment.

In a power system for fuel cell in the second embodiment, chargeability of the lithium-ion cell 120 is utilized to present a configuration in which the lithium-ion cell 120 is charged with use of the output voltage 111 of the fuel cell 110 when there is a surplus in the electric power-output of the fuel cell 110.

Description is given of the power system for fuel cell 102 with reference to FIG. 2.

The power system for fuel cell 102 is based on the configuration of the aforementioned power system for fuel cell 101 with an addition of a charge circuit 160 for charging the lithium-ion cell 120. Moreover, as a modified example of the power system for fuel cell 102, it is also possible to further provide an output termination circuit 170. FIG. 2 shows a case in which the output termination circuit 170 is provided. It is to be noted that in FIG. 2, there is also illustrated an auxiliary equipment driving circuit 190 for driving auxiliary equipment used on start-up of the fuel cell 110. Other configuration is similar to the configuration in the aforementioned first embodiment, and therefore description of the like component members is omitted in here.

Description is now given of the charge circuit 160.

As described above, in a case where the power system for fuel cell 102 is installed in, for example, a notebook-type personal computer, electric power consumption necessary in the personal computer varies depending on the operational environments of peripheral equipment, memories, displays, CPUs and the like. Therefore, when there is a surplus in the electric power feeding from the fuel cell 110, it becomes possible to charge the secondary cell with the surplus electric power. Because of this reason, the power system for fuel cell 102 is provided with the charge circuit 160.

The charge circuit 160, which is connected to a secondary cell, that is the lithium-ion cell 120 in this embodiment, and to the fuel cell 110, is a circuit for charging the lithium-ion cell 120 as described above and has an output voltage comparator circuit 161 and a charge switch circuit 162.

The output voltage comparator circuit 161, which is connected to the output sides of the fuel cell 110 and the lithium-ion cell 120, is a circuit for comparing the output voltage 111 of the fuel cell 110 and the set voltage 115 and also comparing the output voltage 121 of the lithium-ion cell 120 and a chargeable voltage in the lithium-ion cell 120. The chargeable voltage refers to a voltage at which the lithium-ion cell 120 becomes to be able to charge. Since two lithium-ion cells are connected in series in this embodiment, the chargeable voltage is a value 10% lower than 8.4V which is the maximum output voltage 123 in the output voltage 121 of the lithium-ion cell 120, and is set at 7.6V as shown by a reference numeral 124 in FIG. 4. It should be understood that the voltage is not limited to 7.6V.

Such output voltage comparator circuit 161 activates the charge switch circuit 162 only when it is detected that the output voltage 111 of the fuel cell 110 exceeds the set voltage 115, that is 10.4V in the present embodiment and that the output voltage 121 of the lithium-ion cell 120 is the chargeable voltage 124, which is 7.6V or lower.

The charge switch circuit 162, which is connected between the output side of the fuel cell 110 and the output side of the lithium-ion cell 120, is a circuit for applying the output voltage 111 of the fuel cell 110 to the lithium-ion cell 120 to charge the lithium-ion cell 120 only when the output voltage comparator circuit 161 sends a command as described above. More specifically, the lithium-ion cell 120 is charged when the output voltage 111 of the fuel cell 110 is beyond the set voltage 115 of 10.4V, i.e., when electric power is fed from the fuel cell 110 side to the load section 210, i.e., when there is a surplus in the electric power-output of the fuel cell 110.

It is to be noted that even when electric power is fed only from the fuel cell 110 to the load section 210 and so there is the surplus in the electric power of the fuel cell 110, there may be a case in which a load of the fuel cell 110 is increased by charging of the lithium-ion cell 120 and so the surplus in the electric power-output from the fuel cell 110 is run out. Because of this, excessive boost charging is not executed in the charging operation. Accordingly, in the present embodiment, the present system is configured such that charging current is limited in the charge circuit 160 and charging is performed with a charging current of 0.16A. The charging current is equivalent to a charging current for charging the lithium-ion cell 120 of the present embodiment for 10 hours, which is composed of two cells with an output capacity of 830 mAh connected in series, and is equivalent to a value of 1/10 of 1.6A that is the output current during feeding of the maximum electric power-output from the fuel cell 110.

Further, in the present embodiment as described above, the system is configured such that charging mode is activated when the output voltage 121 of the lithium-ion cell 120 is the chargeable voltage 124 or lower, and a voltage larger than 10.4V, the set voltage 115 which is equivalent to the output voltage during maximum electric power-output from the fuel cell 110, is outputted from the fuel cell 110. However, in consideration of a charge load, it is preferable that shift to the charge mode should be conducted at a slightly higher output voltage 111 of the fuel cell 110. Therefore, instead of using the set voltage 115, for example, an output voltage corresponding to 90% of the maximum electric power-output and the output voltage 111 of the fuel cell 110 may be compared. Thus, designing a charging electric power to be limited to 10% of the maximum electric power-output can allow charging neither more or less. More specifically, the output voltage 111 of the fuel cell 110 corresponding to 90% is 10.9V and an output current is 1.4 A. When the fuel cell 110 outputs 1.4A at 10.9V, the charge mode is activated, and when a charging current of 0.16V is fed, the output voltage 111 of the fuel cell 110 is lowered to approximately 10.4V. More specifically, the charging period corresponds to the maximum electric power feeding period of the fuel cell 110, which allows efficient charging.

Further, in a case where a load is rapidly increased against the fuel cell 110 during charging operation, the increase of the load current rapidly reduces the output voltage 111 of the fuel cell 110, as a result of which the fuel cell 110 and the lithium-ion cell 120 are put in the state of alternately feeding electric power to the load section 210. In such a case, the lithium-ion cell 120 experiences rapidly shift from the charge mode to a discharge mode, and such a rapid switching operation is not preferable for the lithium-ion cell 120.

Accordingly, the charge mode should preferably be stopped in advance immediately before the output voltage 111 of the fuel cell 110 reaches the maximum electric power-output 112 of the fuel cell 110 and be shifted to the alternate electric power output state. Therefore, the system can be designed such that a charge termination voltage 116 shown in FIG. 3, i.e., the output voltage 111 of the fuel cell 110 when electric power of the fuel cell 110 reaches, for example, 97% of the maximum electric power-output 112, that is 10.5V, is used as a guide to terminate the charge.

As described above, it is proved that in the power systems for fuel cell 101 and 102 in the present embodiment, managing the output voltage 111 of the fuel cell 110 allows efficient feeding of electric power to the load section 210.

It is to be noted that when the charge mode is activated, operating the electronic equipment of the load in a power saving mode makes it possible to secure more smooth operation of the power system. For example, if the electronic equipment of the load mainly involves CPU operation in the personal computer or the like, for example, its clock frequency itself may be decreased, and if involving image display equipment, for example, luminance of a liquid crystal display may be slightly lowered, so that the load of the fuel cell during the charge mode of the secondary cell may be reduced. This increases a load allowance in the fuel cell during the charge mode, and even with sharp increase of the load during the charging operation, the electric power feeding system can stay on the safe side.

Moreover, generally speaking, the lithium-ion cell is subjected to constant-voltage and constant-current charging for safety reasons. When charge amount is small, constant-current charging which does not involve excessive current is selected, while when the secondary cell is near filled up with the charged electric power, the constant-voltage charging is selected so that the voltage will not exceed the charging voltage. This arrangement is also applied to the systems 101 and 102 in the present embodiment, which adopts a charge method in which the constant-current charging with a charging current of 0.16A is performed till the voltage of the lithium-ion cell reaches the maximum output voltage of 8.4V, and once the voltage is reached at the maximum output voltage of 8.4V, the charging voltage of 8.4V is maintained.

Description is given of a case where the output termination circuit 170 is provided as a modified example of the second embodiment.

In the aforementioned first and second embodiments, the fuel cell 110 and the secondary cell 120 are operated in parallel. Consequently, if either of the cells becomes unworkable, the operation of the system should be terminated. If the fuel cell 110 serving as a main power source becomes inoperable due to, for example, shortage of fuel and temperature factors such as abnormal increase of the operation temperature beyond a boiling point of methanol as fuel or the like, this system enables electric power to be fed for a short period of time from the secondary cell 120. However, if the output voltage 121 of the lithium-ion cell serving as the secondary cell 120 becomes the final discharge voltage 122 or lower, the lithium-ion cell breaks down, making it impossible to manage the auxiliary operation after termination of the operation of the fuel cell 110. For example, an opening/closing operation of a valve relating to the fuel, an operation of a cooling fan, an operation of fuel level display and the like become inoperable. For preventing such situations, a means to disconnect the output of the main power source system from the load section 210 immediately before the voltage of the secondary cell 120 reaches the final discharge voltage 122 is important.

Therefore, as shown in FIG. 2 as the modified example, the output termination circuit 170 may be provided between the output side of the lithium-ion cell 120 and the load section 210. The output termination circuit 170 detects that the output voltage 121 of the lithium-ion cell 120 serving as the secondary cell is lowered to a load termination voltage 125 shown in FIG. 4, which is slightly higher than the final discharge voltage 122 of the lithium-ion cell 120. If the output termination circuit 170 detects the load termination voltage 125, then the output from the lithium-ion cell 120 to the load section 210 is terminated. In this modified example, the load termination voltage 125 is set at approximately 6.2V.

It is to be noted that in each of the aforementioned embodiments, the voltage conversion circuit 130 is described as a drop in voltage type for stepping down the output voltage 111 of the fuel cell 110 because the configuration of two lithium-ion cells as the secondary cells being connected in series is adopted. However, it is not limited thereto, and therefore a voltage conversion circuit may be configured as a step-up circuit in consideration of the output voltage 121 of the secondary cell 120. The step-up circuit may be configured such that a voltage corresponding to the maximum electric power-output from the fuel cell 110 is used to control a lower-limit voltage and diodes are added up, by which the same effects as the aforementioned cases may be achieved. Further, the charging operation is also operable similarly.

Although in each of the aforementioned embodiments, the lithium-ion cell was used as the secondary cell, the secondary cell is not limited thereto. Naturally, other auxiliary cells are applicable and also a direct-current power source produced from a commercial power can be used instead.

The concepts disclosed herein applicable to a power system for fuel cell including a fuel cell and a secondary cell for complementing electric power-output from the fuel cell by the secondary cell and feeding electric power to a load section, and electronic equipment incorporating the power system for fuel cell.

It is to be understood that among the aforementioned various embodiments, arbitrary embodiments may be properly combined so as to achieve the effects possessed by each embodiment.

The disclosure of Japanese Patent Application No. 2004-88844 filed on Mar. 25, 2004 including specification, drawings and claims is incorporated herein by reference in its entirely.

Although the present invention has been illustrated in the accompanying drawings and fully described in conjunction with the forgoing preferred embodiments, various rearrangements and modifications will readily suggest themselves to those skilled in the art. It should be understood that unless departing from the spirit of the invention as set forth by the appended claims, such rearrangements and modifications are intended to be embraced thereby.

What is claimed is:

1. A fuel cell power system, comprising:
   a fuel cell configured to generate a first electric power;
   a secondary cell configured to output a secondary electric power; and
   a fuel cell controller connected to an output of the fuel cell and configured to compare a level of a fuel cell output voltage with a first predetermined value and with a second predetermined value and to prevent the fuel cell from generating power when the level of the fuel cell output voltage is not more than the first predetermined value and to determine an output of the fuel cell and of the secondary cell based on the comparison of the level of the fuel cell output voltage with the second predetermined value.

2. The fuel cell power system according to claim 1, further comprising:
   a rectification circuit connected to receive the output of the fuel cell control circuit and an output of the secondary cell, the rectification circuit configured to control an output of the first electric power and the second electric power,
   wherein the rectification circuit
   outputs the first electric power when the level of the fuel cell output voltage is greater than a level of the secondary cell output voltage,
   outputs the first electric power and the second electric power when the level of the fuel cell output voltage is substantially equal to the level of the secondary cell output voltage, and outputs the second electric power when the level of the fuel cell output voltage is less than the level of the secondary cell output voltage.

3. The fuel cell power system according to claim 2, wherein during a period from when the fuel cell output voltage attains the first predetermined value until a time before the fuel cell output voltage attains a breakdown voltage, the fuel cell controller lowers the fuel cell output voltage to at least a discharge voltage of the secondary cell.

4. The fuel cell power system according to claim 2, wherein the rectification circuit is formed from diodes.

5. The fuel cell power system according to claim 1, wherein the first predetermined value corresponds to the fuel cell output voltage when a maximum electric power is output from the fuel cell.

6. The fuel cell power system according to claim 1, wherein the fuel cell controller sets the first predetermined value by converting the fuel cell output voltage to a voltage greater than a maximum output voltage of the secondary cell.

7. The fuel cell power system according to claim 1, wherein the fuel cell controller comprises:
a voltage detection circuit configured to detect the fuel cell output voltage;
a voltage setting circuit configured to set the second predetermined value; and
a feedback section configured to apply feedback to a voltage outputted from the voltage setting circuit.

8. The fuel cell power system according to claim 7, wherein the voltage setting circuit sets the fuel cell output voltage to a voltage corresponding to the second predetermined value by the feedback section when the voltage detection circuit detects the fuel cell output voltage that is higher than the first predetermined value.

9. The fuel cell power system according to claim 7, wherein the voltage setting circuit terminates the output of the fuel cell when the voltage detection circuit detects that the fuel cell output voltage has attained the first predetermined value.

10. The fuel cell power system according to claim 1, further comprising a charge circuit connected to the fuel cell and the secondary cell and is configured to charge the secondary cell.

11. The fuel cell power system according to claim 10, wherein the charge circuit comprises:
an output voltage comparator circuit connected to the output of the fuel cell and the output of the secondary cell, and is configured to compare the output voltage of the fuel cell and the first predetermined value and compare the output voltage of the secondary cell and a chargeable voltage value of the secondary cell; and
a switch circuit connected between the output of the fuel cell and the secondary cell and is configured to apply the fuel cell output voltage to the secondary cell to charge the secondary cell.

12. The fuel cell power system according to claim 11, wherein the switch circuit applies the output voltage to the secondary cell when the output voltage comparator circuit detects that the fuel cell output voltage is greater than the first predetermined value and that the output voltage of the secondary cell has attained the chargeable voltage value.

13. The fuel cell power system according to claim 11, wherein the output voltage comparator circuit is further configured to detect a charge termination voltage after the switch circuit applies the fuel cell output voltage to the secondary cell.

14. The fuel cell power system according to claim 13, wherein the charge termination voltage is set to a value higher than the first predetermined value.

15. The fuel cell power system according to claim 13, wherein the switch circuit terminates the output of the fuel cell output voltage to the secondary cell when the output voltage comparator circuit detects the charge termination voltage.

16. The fuel cell power system according to claim 1, further comprising:
an output termination circuit connected to the output of the secondary cell and capable of being connected to a load and is configured to determine when the output voltage of the secondary cell is lower than a load termination voltage.

17. The fuel cell power system according to claim 16, wherein the load termination voltage is set to a value higher than a final discharge voltage of the secondary cell.

18. The fuel cell power system according to claim 16, wherein the output termination circuit is configured to terminate output from the secondary cell when the load termination voltage is detected.

19. Electronic equipment powered by a fuel cell system comprising: a fuel cell power system; and
a load configured to receive first electric power and second electric power fed from the fuel cell power system,
wherein the fuel cell power system includes:
a fuel cell configured to generate a first electric power;
a secondary cell configured to output a secondary electric power;
a fuel cell controller connected to an output of the fuel cell and configured to compare a level of a fuel cell output voltage with a first predetermined value and with a second predetermined value and to prevent the fuel cell from generating power when the level of the fuel cell output voltage is not more than the first predetermined value and and to determine an output of the fuel cell and of the secondary cell based on the comparison of the level of the fuel cell output voltage with the second predetermined value.

20. An electric power feeding method in a fuel cell power system for fuel cell having a fuel cell configured to generate first electric power and a secondary cell configured to output second electric power, the method comprising the steps of:
(a) setting a first predetermined value;
(b) setting a second predetermined value;
(c) comparing a fuel cell output voltage with the first predetermined value and with the second predetermined value;
(d) preventing the fuel cell from generating power when the fuel cell output voltage is not more than the first predetermined value;
(e) determining an output of the first electric power and the second electric power by comparing the fuel cell output voltage with the second predetermined value.

21. A fuel cell power system, comprising: a fuel cell configured to generate a first electric power;
a secondary cell configured to output a secondary electric power; and
fuel cell controlling means for comparing a level of a fuel cell output voltage with a first predetermined value and with a second predetermined value for preventing the fuel cell from generating power when the level of the fuel cell output voltage is not more than the first predetermined value and for determining an output of the fuel cell and of the secondary cell based on the comparison of the level of the fuel cell output voltage with the second predetermined value.

22. The fuel cell power system according to claim 21, further comprising:

rectification means for controlling an output of the first electric power and the second electric power, wherein the rectification means outputs the first electric power when the level of the fuel cell output voltage is greater than a level of the secondary cell output voltage, outputs the first electric power and the second electric power when the level of the fuel cell output voltage is substantially equal to the level of the secondary cell output voltage, and outputs the second electric power when the level of the fuel cell output voltage is less than the level of the secondary cell output voltage.

23. The fuel cell power system according to claim 22, wherein during a period from when the fuel cell output voltage attains the first predetermined value to a moment before the fuel cell output voltage attains a breakdown voltage, the fuel cell controlling means lowers the fuel cell output voltage to at least a discharge voltage of the secondary cell.

24. The fuel cell power system according to claim 21, wherein the first predetermined value corresponds to the fuel cell output voltage when a maximum electric power is output from the fuel cell.

25. The fuel cell power system according to claim 21, wherein the fuel cell controlling means sets the first predetermined value by converting the fuel cell output voltage to a voltage greater than a maximum output voltage of the secondary cell.

26. The fuel cell power system according to claim 21, wherein the fuel cell controller comprises:

voltage detection means detecting the fuel cell output voltage;

voltage setting means for setting the second predetermined value; and feedback means applying feedback to a voltage outputted from the voltage setting circuit.

27. The fuel cell power system according to claim 26, wherein the voltage setting means sets the fuel cell output voltage to a voltage corresponding to the second predetermined value by the feedback means when the voltage detection circuit detects the fuel cell output voltage that is higher than the first predetermined value.

28. The fuel cell power system according to claim 26, wherein the voltage setting means terminates the output of the fuel cell when the voltage detection means detects that the fuel cell output voltage has attained the first predetermined value.

29. The fuel cell power system according to claim 21, wherein the rectification means is formed from diodes.

30. The fuel cell power system according to claim 21, further comprising charge means for charging the secondary cell.

31. The fuel cell power system according to claim 30, wherein the charge means comprises:

output voltage comparison means for comparing the fuel cell output voltage and the first predetermined value and for comparing the output voltage of the secondary cell and a chargeable voltage value of the secondary cell; and switching means for applying the fuel cell output voltage to the secondary cell to charging the secondary cell.

32. The fuel cell power system according to claim 31, wherein the switching means applies the output voltage to the secondary cell when the output voltage comparison means determines that the fuel cell output voltage is greater than the first predetermined value and that the output voltage of the secondary cell has attained the chargeable voltage value.

33. The fuel cell power system according to claim 31, wherein the output voltage comparison means is further configured for detecting a charge termination voltage after the switching means applies the fuel cell output voltage to the secondary cell.

34. The fuel cell power system according to claim 33, wherein the charge termination voltage is set to a value higher than the first predetermined value.

35. The fuel cell power system according to claim 33, wherein the switching means terminates the output of the fuel cell output voltage to the secondary cell when the output voltage comparison means detects the charge termination voltage.

36. The fuel cell power system according to claim 31, further comprising:

an output termination means for determining when the output voltage of the secondary cell is lower than a load termination voltage.

37. The fuel cell power system according to claim 36, wherein the load termination voltage is set to a value higher than a final discharge voltage of the secondary cell.

38. The fuel cell power system according to claim 36, wherein the output termination means terminates the output from the secondary cell when the load termination voltage is detected.

* * * * *